Dec. 4, 1923.
C. DABNEY
EMERGENCY MUD BOOT
Filed Dec. 26, 1922
1,476,597
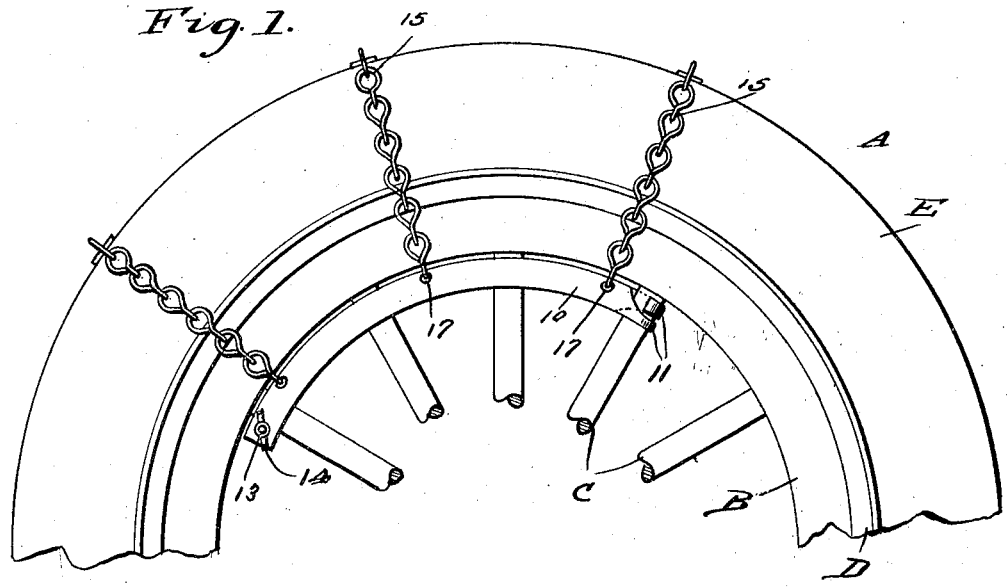
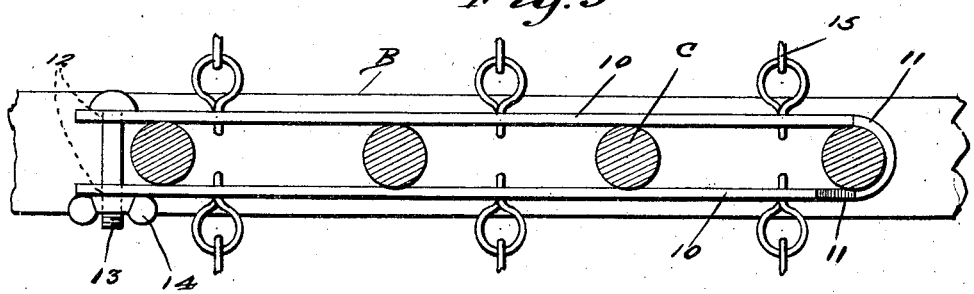
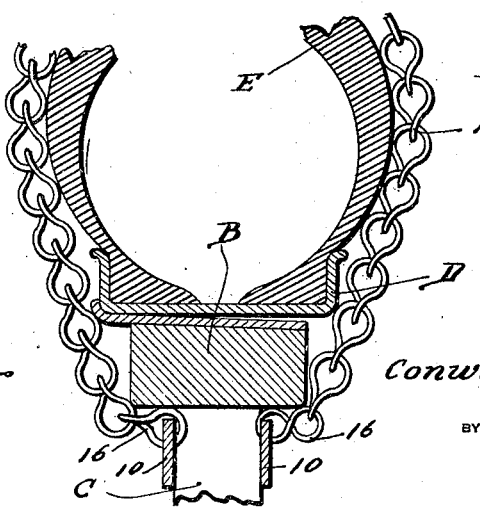
Conway Dabney INVENTOR Patented Dec. 4, 1923.

1,476,597

UNITED STATES PATENT OFFICE.

CONWAY DABNEY, OF CRYSTAL SPRINGS, MISSISSIPPI.

EMERGENCY MUD BOOT.

Application filed December 26, 1922. Serial No. 609,020.

*To all whom it may concern:*

Be it known that I, CONWAY DABNEY, a citizen of the United States, residing at Crystal Springs, in the county of Copiah and State of Mississippi, have invented new and useful Improvements in Emergency Mud Boots, of which the following is a specification.

This invention relates to traction devices for motor vehicles and has for its object the provision of a novel extricating device in the nature of an attachable chain structure which may be engaged upon a vehicle wheel in case of emergency for the purpose of effecting extrication from a mud hole or other slippery place where the wheel would ordinarily spin idly.

An important and more specific object is the provision of a device of this character including bars adapted to be placed at opposite sides of the wheel and detachably engaged thereon, these bars being connected by a plurality of chains which extend transversely of the tire.

An additional object is the provision of a device of this character which will be simple and inexpensive in manufacture, easy to apply, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of a wheel equipped with my device,

Figure 2 is a cross section therethrough and

Figure 3 is a sectional view taken through several spokes and looking at the inside of the wheel felly showing the device applied.

Referring more particularly to the drawings the letter A designates a vehicle wheel including the usual felly B mounted upon spokes C and supporting a rim D which carries the tire E. In carrying out my invention I provide a pair of bars 10 which are curved as shown and which are designed to be placed against opposite sides of the wheel. At one end these bars are formed with hooks 11 for engagement upon the spokes and at their other ends they are provided with holes 12 through which may be passed a bolt 13 carrying a clamping nut 14. The numeral 15 represents a plurality of cross chains which are provided at their ends with elongated link members 16 which are suitably connected with the bars 10 as by being passed through holes 17 therein.

When use of the device is desired, it is placed in position with the chains 15 disposed against the tread of the tire and with the bars 10 located at opposite sides of the wheel. The hooks 11 at one end of the bars engage upon the spokes while the bolt 13 is passed through the holes 12 at the other ends of the bars and the nut 14 applied for clamping the device in place. In the operation it will be seen that the device will act to insure traction and enable the vehicle to pull out of a mud hole or the like.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

An extricating device of the character described comprising a pair of elongated bars provided at one end with hooks engageable with a spoke of a wheel, means for detachably connecting the other ends of the bars together, and a plurality of cross chains connected with the bars and engageable against the periphery of a tire.

In testimony whereof I affix my signature.

CONWAY DABNEY.